United States Patent [19]

Pischzik et al.

[11] 4,410,156

[45] Oct. 18, 1983

[54] SUSPENSION OF PIPES OR TUBES UNDERGOING THERMAL EXPANSION

[75] Inventors: Bruno Pischzik, Ratingen; Johann Schneiderat, Xanten, both of Fed. Rep. of Germany

[73] Assignee: Mannesmann Aktiengesellschaft, Düsseldorf, Fed. Rep. of Germany

[21] Appl. No.: 950,086

[22] Filed: Oct. 10, 1978

[30] Foreign Application Priority Data

Oct. 8, 1977 [DE] Fed. Rep. of Germany ....... 2745473

[51] Int. Cl.$^3$ ............................................. F16L 3/00
[52] U.S. Cl. .................................................... 248/58
[58] Field of Search ................. 248/58, 59, 60, DIG. 1

[56] References Cited

U.S. PATENT DOCUMENTS

| | | | |
|---|---|---|---|
| 2,574,309 | 11/1951 | Wood | 248/58 |
| 3,167,285 | 1/1965 | Suozzo | 248/59 |
| 3,539,136 | 11/1970 | Suozzo | 248/59 |
| 3,637,176 | 1/1972 | Suozzo | 248/59 |
| 3,718,305 | 2/1973 | Suozzo | 248/58 |

*Primary Examiner*—Francis K. Zugel
*Attorney, Agent, or Firm*—Ralf H. Siegemund

[57] ABSTRACT

A tube or pipe undergoing thermal expansion when used and being part of a pipeline system experiences lateral and longitudinal displacements of suspension points in vertical direction. The tube side suspension points are connected to levers pivoted to the tube, the pivot points moving up or down with the tube. The levers are connected further to rods being linked with their other ends to the tube to provide a control displacement as the tube longitudinally expands thereby pivoting the levers such that the thermal expansion displacement of the tube is compensated. Load relief for the rods are additionally provided as well as moment control and compensation.

7 Claims, 7 Drawing Figures

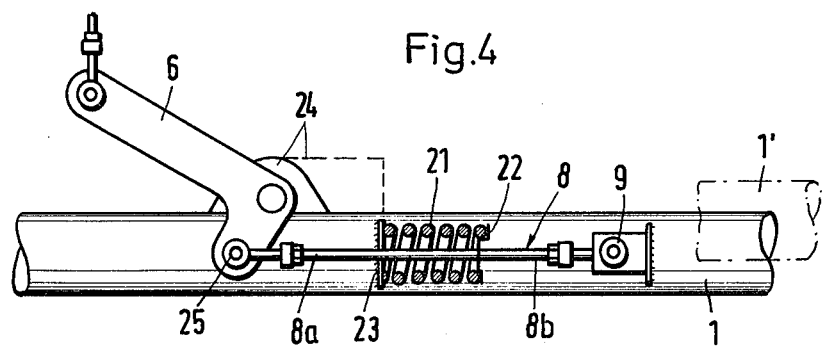
Fig.4
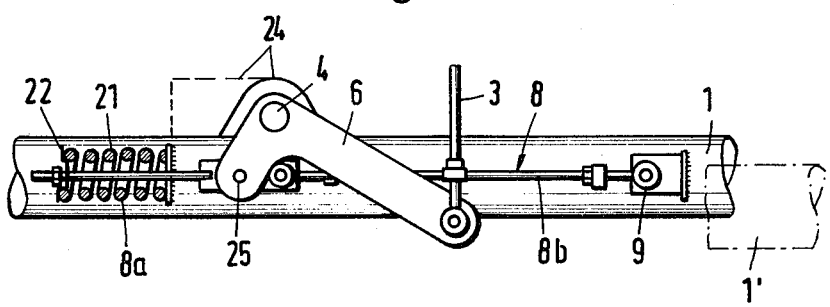
Fig.5
Fig.6
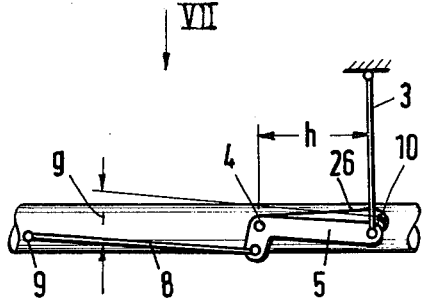
Fig.7
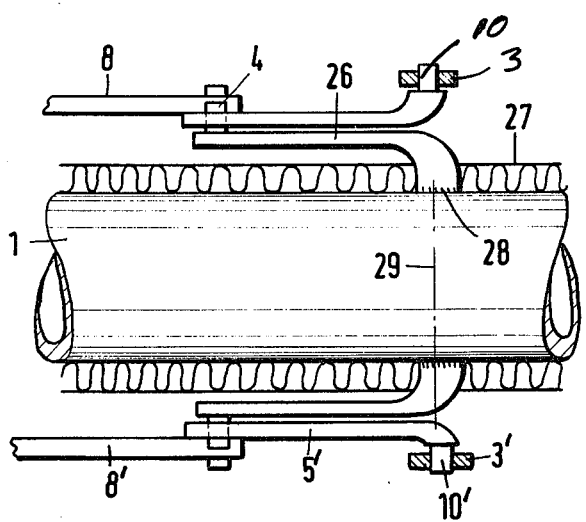

SUSPENSION OF PIPES OR TUBES UNDERGOING THERMAL EXPANSION

BACKGROUND OF THE INVENTION

The present invention relates to suspension of tubes and pipes conducting hot fluids such as steam.

Suspensions of the type to which the invention pertains are, for example, needed in power plants. It is required that the suspension force exerted upon the tube or pipe is and remains constant, even if the point of suspension of the tube is displaced relative to a true stationary point in the building, frame, foundation or the like from which the tube or pipe is suspended, the displacement being the result of thermal expansion of the tube.

The German Patent No. 1,159,710, particularly FIG. 5 thereof, discloses a suspension for a tube attempting to meet the above-mentioned requirement, wherein a follow-up type feedback controller, including an electric motor operating a spindle, is provided to adjust the spacing between two points of suspension on frame and tube, so that the force of suspension does not vary significantly. This control device is particularly provided to compensate temperature dependent displacements of the tube side point of suspension. Any change in the suspension force generally is effective as a change (increase) in tension in the tube or pipe. It is obvious that this type of suspension is very elaborate and will fail, for example, upon electric power failure.

This known suspension reacts against vibrations of the tube or against earthquakes just as if it were completely rigid, which is a desirable feature but contrasts with resilient or other suspensions, also capable of taking up thermal expansion but failing to resist adequately rigidly to other external forces.

DESCRIPTION OF THE INVENTION

It is an object of the present invention to provide a new and improved suspension device for pipes or tubes which is constructed for compensation of thermally induced displacement of the tube or pipe without requiring active, powered feedback control.

It is another object of the present invention to provide a new and improved tube suspension which reacts rigidly to external forces but compensates thermal exemptions of the tube.

In accordance with the preferred embodiment of the present invention, it is suggested to provide an anchor means (e.g. a rod) for being suspended from a stationary point on a frame, building, foundation, etc., and establishing a connect point which is to remain invariant as to vertical, thermally induced displacement and dislocation of a tube or pipe being suspended or depended in that connect point; a two arm lever is provided in which three linkage points define the two arms, and one of the two outer linkage points is linked and pivoted to the connect point of the anchor; a rod has one end pivoted to the tube and its other end connects either to the other outer linkage points or to the inbetween point depending on whether the tube is horizontally or vertically oriented. The remaining lever linkage point is pivoted to the tube in a point spaced from the pivot point of the rod. The rod extends generally alongside the tube but is spaced therefrom so as to not to assume its temperatures. In the case of a horizontal orientation of the tube, the lever is an angle lever whose in-between point connects to the tube; if the tube is vertically oriented, the lever is straight and the in-between linkage point connects to the rod. In either case, one may affix the inventive suspension system to already existing and installed tubes or pipelines; the new suspension occupies very little space.

The principle behind the invention is to geometrically fix the connect point of the anchor in a dynamic fashion that inherently takes up dislocations which are thermally introduced. One establishes two reference points on the tubes which are displaced relative to each other as the tube expands. The rigid rod that does not expand will, therefore, pivot the lever, including, of course, the arm to which the anchor is connected. The length of that arm is selected so that the resulting displacement of the connect point is equal and opposite to the displacement the tube experiences in the opposite direction on account of thermal expansion.

In view of the lever arm action, and particularly in view of the fact that the lever arm between tube linkage-rod linkage is smaller than the other lever arm as connected to the anchor, it appears that the rod has to take up forces greater than the suspension force. Since the rod is rather long (to be described below), it is desirable to provide a resilient load relief reacting some of the forces on the rod into the tube, preferably in such a manner that the residual rod forces are only tension forces. In addition, it is desirable to compensate the moment introduced by operation of the pivot lever. One can provide such compensation by displacing the location of support for the pivot of the lever on the tube to establish a compensatory lever arm.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 shows a device similar to the one illustrated in FIG. 1, but supplemented by a load relief spring;

FIG. 5 shows a device similar to the one illustrated in FIG. 2, but supplemented for load relief by a spring to obtain only tension loads on a rod;

FIG. 6 shows a device similar to the one illustrated in FIG. 1, permitting displacement of the point of dependence on the tube to counteract lever moments; and FIG. 7 is an elevation of a detail of the device of FIG. 6, but on an enlarged scale.

Figure 1:
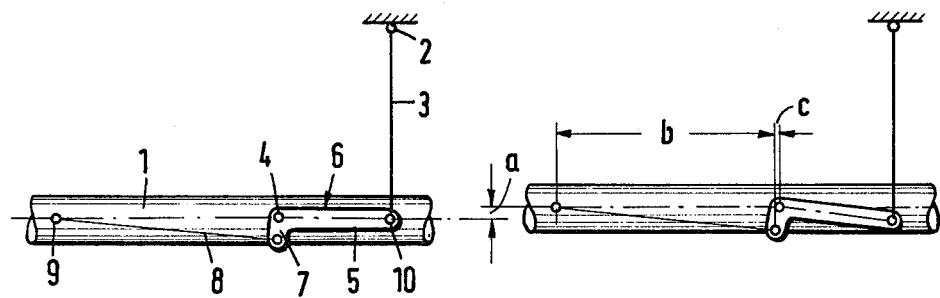
FIG. 1 illustrates somewhat schematically a device for depending a horizontal tube, the two parts of the figure show the device at two different temperatures, the tube moving up with increasing temperature.

Proceeding now to the detailed description of the drawings, FIG. 1 et seq illustrate a tube or pipe 1 being a part of a high temperature steam conduit. This horizontally extending portion of the tube or pipeline branches off a vertical line (not shown), and that vertical line expands with temperature. The left-hand portion of FIG. 1 shows the pipe when cold, but upon conducting hot steam, the vertical branch to which this horizontal pipe connects, will expand, and, for example, push the horizontal tube up by the distance a.

Reference numeral 2 denotes a point on the building, frame or other stationary support from which the pipe 1 is dependent, i.e. it is a suspension point to which is connected a rigid anchor 3. The lower end of that anchor is not directly affixed to the pipe or tube 1, but establishes a connect point 10 for the compensating device in accordance with the preferred embodiment. The anchor 3 is linked to a long arm 5 of an angle lever 6. The lever 6 has a short arm 7 to which is linked one end of a rod 8. The other end of rod 8 is pivotally linked to the tube 1 by means of a pin 9. Moreover, a pivot point, pin or shaft 4 for the lever 6 is also linked to the tube.

The pins etc., 4 and 9, extend transversely to and from the tube. It is important to realize that rod 8 as well as lever 6 are disposed outside of the thermal insulation of the tube and, therefor, these elements 6, 8 are exposed directly to ambient (room) temperature.

As stated, the left-hand part of FIG. 1 shows the device and tube 1 at room temperature, the tube being cold. As, for example, hot steam passes through the tube, it heats the tube which expands axially. The spacing between pins 4 and 9 had originally the value b (cold tube). The thermal expansion adds the increment c to that distance. Since rod 8 does not expand, the rod pulls on short arm 7 and pivots it from the straight down position it had originally to a slightly oblique position.

The lever 6 pivots clockwise in this view and lowers the anchor connect point 10. If the effective vertical displacement of part 10 relative to a horizontal plane running, e.g. through the tube's axis is exactly equal to the distance a by which the tube has been lifted on account of a thermal expansion of the vertical branch, the expansion as it may be effective at this suspension point for the pipe is fully compensated. It can readily be seen that this condition can be attained by appropriately selecting the relative length of the lever arms 5 and 7. The ratio of these lever arm lengths must be equal to the ratio of the distance between pins 4 and 7 as participating directly in the effect of horizontal tube expansion, and the expected distance a of vertical displacement. It may well be of advantage to render the linking point adjustable, i.e. to provide for an adjustability of the effective length of that lever arm 5 to obtain fine tuning of this dynamic balancing system.

If, in fact, the linking point 10 of arm 5 is pivoted for vertical displacement by a distance precisely equal to the displacement of the tube 1, and if the tube 1 is, in fact, shifted vertically only (which is, of course, a somewhat idealized limit condition), then the force of suspension effective at anchor 3 remains invariant, because the location in space of point 10 is dynamically maintained. One can also see that rod 8 and lever 6 are rigid vis-a-vis purely mechanical forces acting on the pipe. Thus, the dependence of the tube can indeed be regarded as being of the fixed point type which aspect is important, for example, when the pipe is being repaired. During operation, forces resulting from tube vibrations or from earthquakes, are transmitted without attenuation into the point 2 of the frame, building, etc. These forces are not reacted into the suspension as such.

It should be mentioned that the side elevation of FIG. 1 (and also of FIG. 2) hides a second suspension system on the other side of the tube. This second system is an exact duplicate of the rod-lever-anchor arrangement that is visible. The duplication can be seen also in FIG. 7 as will be described.

Figure 2:
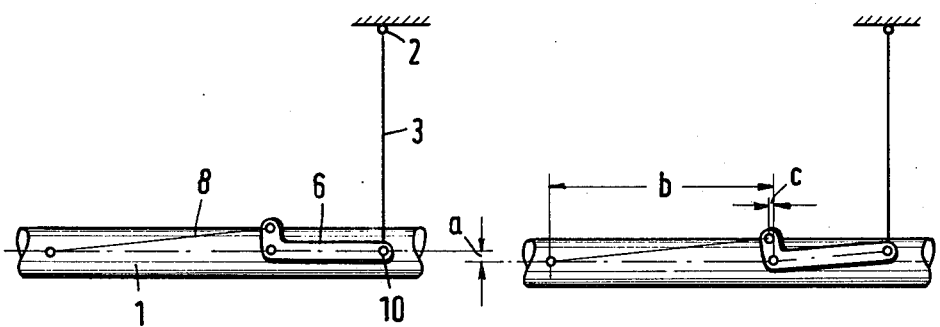
FIG. 2 illustrates analogously a similar device but the tube moves down with increasing temperature.

FIG. 2 shows analogously a dependence of the pipe in a situation in which the expected displacement of the tube when hot, is in down direction, again by the distance a. The same or symmetric equipment can be used here, the short arm of the lever 6 points up, and the lever will pivot counterclockwise. However, rod 8 is subjected to longitudinal compression rather than tension as in FIG. 1. In both cases, one should use a rather long rod 8 which is of advantage for the operational resolution of the system. The longer rod 8, the longer is this reference path between points 9 and 4 on the tube whose thermal expansion is used to control the disposition and angle of rotation of lever 6. The pivot angle will be larger for a longer rod; that may require either to make the arm 7 longer or arm 5 shorter, but enhances sensitivity of the system to the expansion.

Figure 3:
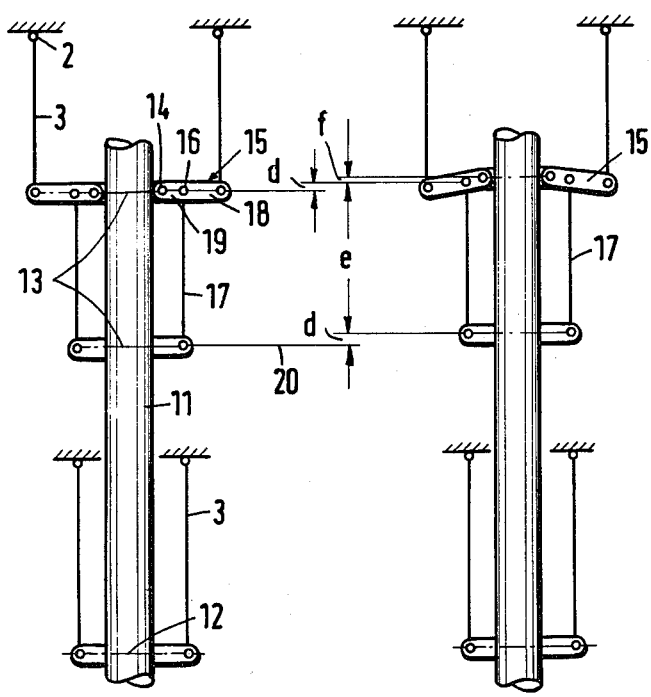
FIG. 3 illustrates a device also in two parts for different temperatures for depending a vertical tube which expands upwardly with increasing temperature.

FIG. 3 shows the suspension of a vertical tube 11, and it is also assumed that this tube or pipe pertains to a high temperature steam line. It is further assumed that the pipeline has a lower, absolutely fixed and rigid suspension point 12; in other words, the pipe as supported in point 12 does not move on account of any thermal expansion. The pipe or tube is additionally dependent in a region 13 which can be displaced on account of length changes in the tube. This region 13 has a lower level 20 above the low, fixed point of suspension, and an upper level which establishes a reference path. A pair of lugs 14 are provided in that upper level. A pair of levers 15 are respectively pivoted to the lugs 14. These pivot connections refer to one outer end of each of the two levers.

The pivot point of the lever is established by a pin 16 on a vertical rod 17. Each pin 16 is particularly located on the intermediate linking point for the respective lever. This rod is positioned relatively remote from the pipe 11. Each lever 15 has a short arm 19 and a long arm 18 which extends from the respective pivot 16 in the opposite direction as the short arm. The vertical suspension rods 3 have their lower ends and connect points linked to the long arms 18. One does not use an angle lever in this case, because there is no need to translate a longitudinal displacement into a controlled lateral displacement as in the cases of FIGS. 1 and 2.

As the tube becomes hot, its length expands, i.e. the structure changes from the left-hand to the right-hand state in FIG. 3. Accordingly, the lower support point for rods 17 is moved up, which is the result of thermal expansion of the tube causing the support level 20 to be lifted by the distance d, lifting pin 16 by that distance. However, the portion of tube 11 between level 20 and the level of lugs 14 espands also, e.g. by the smaller distance f, causing the lever 15 to pivot so that the end of long arm 18 is shifted down. Again, the lever dimensions are chosen so that this down displacement equals d+f in which case the linking point between 18 and 2 remains spatially invariant, the force on rod 3 is not changed.

Should the pipe 11 be displaced laterally for any reason, suspension rods 3 will yield as they are mounted in pendulum fashion. The thermal expansion as described is not interfered with by such lateral deflection. The auxiliary rods such as 8 and 17 can be subjected to tension as well as compression. Both possibilities have to be permitted as to rod 17, if the lever arm ratios and the ratios of the effective length expansions are not exactly equal. In the case of compression, one has to make the rods rather thick. Due to the fact that the lever arm ratios translate forces in the inverse, one can readily see that these forces on the rods could be much larger than the suspension forces on anchor 3. Thus, it is advisable to provide for load relief.

FIG. 4 illustrates a device by means of which a tension rod is relieved; the structure is constructed otherwise as was explained with reference to FIG. 1. FIG. 4 illustrates the lever 6, the tube 1 (position 1' results from thermal expansion lift as described), and the rod 8. The rod 8 is now provided additionally by a surrounding coil spring 21. This spring is disposed between a disk or spring washer 22 on rod 8 and a support or thrust block 23 which is rigidly secured to tube 1. Thrust support 23 may be part of a case which sits on a lug 24 which, in turn, is welded to the tube.

The rod 8 is on one end connected to a linkage point 25 on the short arm of lever 6. Any force transmitted upon the rod at that point is branched; a portion serves to compress spring 21 as against the anchored disk or ring 22. The remainder of that force is effective at the rear end 8b of rod 8, and transmitted upon linkage point 9. That residual force, however, is significantly reduced. The bulk of the force is stored as resilient reaction in spring 21, thereby relieving the linking point 9 to a considerable extent, and that, in turn, relieves the rod 8 as a whole.

FIG. 5 shows load relief for a FIG. 2 suspension, when the "hot" position of a tube (position 1') is below the normal, "cold" position. In this case, casing 24 is differently located and spring 21 is disposed outside the zone between lever 6 and linking point 19. Accordingly, rod 8 is extended beyond the short arm linking point 25 and the spring dish 22 is disposed near the end of the rod.

In the case of FIG. 5, spring 21 is selected sufficiently strong to balance the suspension force in anchor 3. This means that the rod portion 8b between 25 and 9 is actually not needed. That portion is needed, however, when the thermal expansion takes place to obain the requisite pivot action on lever 6. As that occurs, the portion 8b of the rod exerts an additional force upon the spring 21 further compressing the spring. Consequently, point 25 is shifted to the right; since the anchor point 3–6 remains invariant in its level, the tube as suspended moves down relative to the foundation. Thus, one may need merely a wire in place of the rod portion 8b to pull the lever 6 counterclockwise, but 8a must be a rod as it takes up and transmits the force of the angle lever 6.

Of course, it has to be considered that the inclusion of a spring into the force transmission system and linkage amounts to an abolition of the rigidity of the system as far as externally effective forces is concerned. Thus, the spring 21 should be very strong to minimize this introduction of resiliency. Indeed, if the spring is very strong, it will not or hardly react resiliently to external forces.

In view of the forgoing, it is apparent that the inclusion of a spring is a compromise between rigidity of suspension and need for load relief. An alternative solution for the load relief would be to eliminate the spring 21 and to extend the long arm 5 of lever 6 in the other direction to establish a third arm. A constant type hanger may then be connected to that third arm. However, this construction occupies more space and is more involved than a simple spring. Thus, the construction as illustrated is clearly preferred.

Turning back for the moment to the suspensions shown in FIGS. 1, 2, 4 and 5, and involving a horizontally positioned tube, that tube has to take up statically a moment defined by the product of the suspension force in anchor 3 and of the effective lever length in the longer arm 5. This parasitic moment could be offset and eliminated as shown in FIGS. 6 and 7.

The tube suspension point 4 of lever 6 is not affixed to tube 1, but in an outrigger type member 26, having the following features. As stated above, there is a second suspension at that point, anchor 3', lever 6', rod 8', etc., and including also a second moment compensating member 26'. Each of the members 26 and 26' (a) is as long as the arm 5, (b) penetrates the thermal insulation 27 of the tube, and (c) is connected to a welding seam 28 of the pipe or tube. Alternatively, the members may not be welded but clamped to and around the tube. It can readily be seen that the connection points 4 for linking the levers to the tube are displaced by means of the arms 26, 26' to be in line with suspension points 10 and 10', "in line" meaning the axis about which the parasitic moment is formed.

The force in anchor 3 loads the arm 5 of lever 6 with a counterclockwise moment along lever arm length around pivot 4. This, however, results in a clockwise moment of members 26. The latter moment is reacted into the pipe 1 through the welding seam. The tension force of rod 8 and the effective distance g (see FIG. 6) between the two suspension points on the pipe produces a counterclockwise moment in the pipe, balancing the one reacted into the welding seam by the members or arms 26.

The invention is not limited to the embodiments described above but all changes and modifications thereof not constituting departures from the spirit and scope of the invention are intended to be included.

We claim:

1. Suspension device for a tube which undergoes thermal expansion, and which is to be suspended from a stationary frame, foundation, building, etc., comprising:
   anchor means having a stationary point of suspension with respect to said frame, foundation, or building, and defining a connect point of fixed distance therefrom;
   a two-arm lever, the arms being defined by three linkage points, two outer ones and an in-between one, one of the outer ones being linked to said connect point;
   a rod disposed generally alongside, but spaced from said tube and having one end pivoted to the tube;
   spring means, bearing against a support point on the rod and against another support point on the tube to take up at least part of the suspension force; and
   the other end of said rod being pivoted to one of the two other linkage points not connected to said connect point, the remaining linkage point being pivoted on the tube in spaced apart relation to the pivoting of the one end of the rod.

2. Suspension device as in claim 1, wherein the tube is horizontally oriented and is displaced laterally and undergoes longitudinal thermal expansion, said two arm lever being an angle lever, the rod having its other end linked to the other, outer linkage point, the in-between point being pivoted on the tube.

3. Device as in claim 1, said spring being dimensioned so that the rod between the point of engaging the spring and the remaining linking point on the lever is only subjected to tension.

4. Device as in claim 1, wherein said tube is vertically disposed, said two arm lever being a linear lever, said rod being linked to the in-between linking point on the lever.

5. Device as in claim 1, said remaining linking point being on a member acting as a fixed one-arm lever and being affixed to the tube at a point situated in a plane at right angles to the tube's axis and traversing also said connect point.

6. Device as in claim 1, wherein the rod traverses axially the spring, the support point on the tube being located between the support point on the rod and said other end of the rod.

7. Device as in claim 1 or 3, said rod having an extension beyond said end, said spring acting as between an end of the extension and said other support point on the tube.

* * * * *